(12) United States Patent
Kim

(10) Patent No.: US 11,485,491 B1
(45) Date of Patent: Nov. 1, 2022

(54) TETHERED AIRCRAFT MASS TRANSPORTATION

(71) Applicant: Nam Kim, Duluth, GA (US)

(72) Inventor: Nam Kim, Duluth, GA (US)

( * ) Notice: Subject to any disclaimer, the term of this patent is extended or adjusted under 35 U.S.C. 154(b) by 0 days.

(21) Appl. No.: 17/552,653

(22) Filed: Dec. 16, 2021

(51) Int. Cl.
| | |
|---|---|
| *B64C 37/00* | (2006.01) |
| *B64C 39/02* | (2006.01) |
| *B64C 31/02* | (2006.01) |
| *B64C 3/56* | (2006.01) |
| *B64D 25/00* | (2006.01) |
| *B60L 13/00* | (2006.01) |
| *B61D 15/00* | (2006.01) |
| *B64F 3/02* | (2006.01) |

(52) U.S. Cl.
CPC ............ *B64C 37/00* (2013.01); *B60L 13/006* (2013.01); *B61D 15/00* (2013.01); *B64C 3/56* (2013.01); *B64C 31/02* (2013.01); *B64C 39/022* (2013.01); *B64D 25/00* (2013.01); *B64F 3/02* (2013.01); *B60L 2200/10* (2013.01); *B60L 2200/26* (2013.01)

(58) Field of Classification Search
CPC ........... B64C 37/00; B64C 3/56; B64C 31/02; B64C 39/022; B61D 15/00; B64D 25/00; B60L 13/006; B60L 2200/10; B60L 2200/26; B64F 3/02; B64F 1/08
See application file for complete search history.

(56) References Cited

U.S. PATENT DOCUMENTS

| | | | |
|---|---|---|---|
| 2015/0015017 A1* | 1/2015 | Benoliel | B61B 15/00 296/26.02 |
| 2015/0239557 A1* | 8/2015 | Boros | B60L 58/21 244/1 TD |
| 2018/0312251 A1* | 11/2018 | Petrov | B64C 3/38 |
| 2018/0370386 A1* | 12/2018 | Lery | B60L 53/665 |
| 2019/0366860 A1* | 12/2019 | Lin | B60L 50/53 |
| 2022/0002000 A1* | 1/2022 | Uskolovsky | B64F 1/10 |

* cited by examiner

*Primary Examiner* — Rodney A Bonnette
(74) *Attorney, Agent, or Firm* — Brient IP Law, LLC

(57) ABSTRACT

A mass transportation system provides an airborne passenger vehicle tethered to a host vehicle. The host vehicle traverses along a fixed route. The airborne passenger vehicle moves between a stowed position fixedly secured to the host vehicle and a deployed position in which the airborne passenger vehicle is flying above the host vehicle.

20 Claims, 5 Drawing Sheets

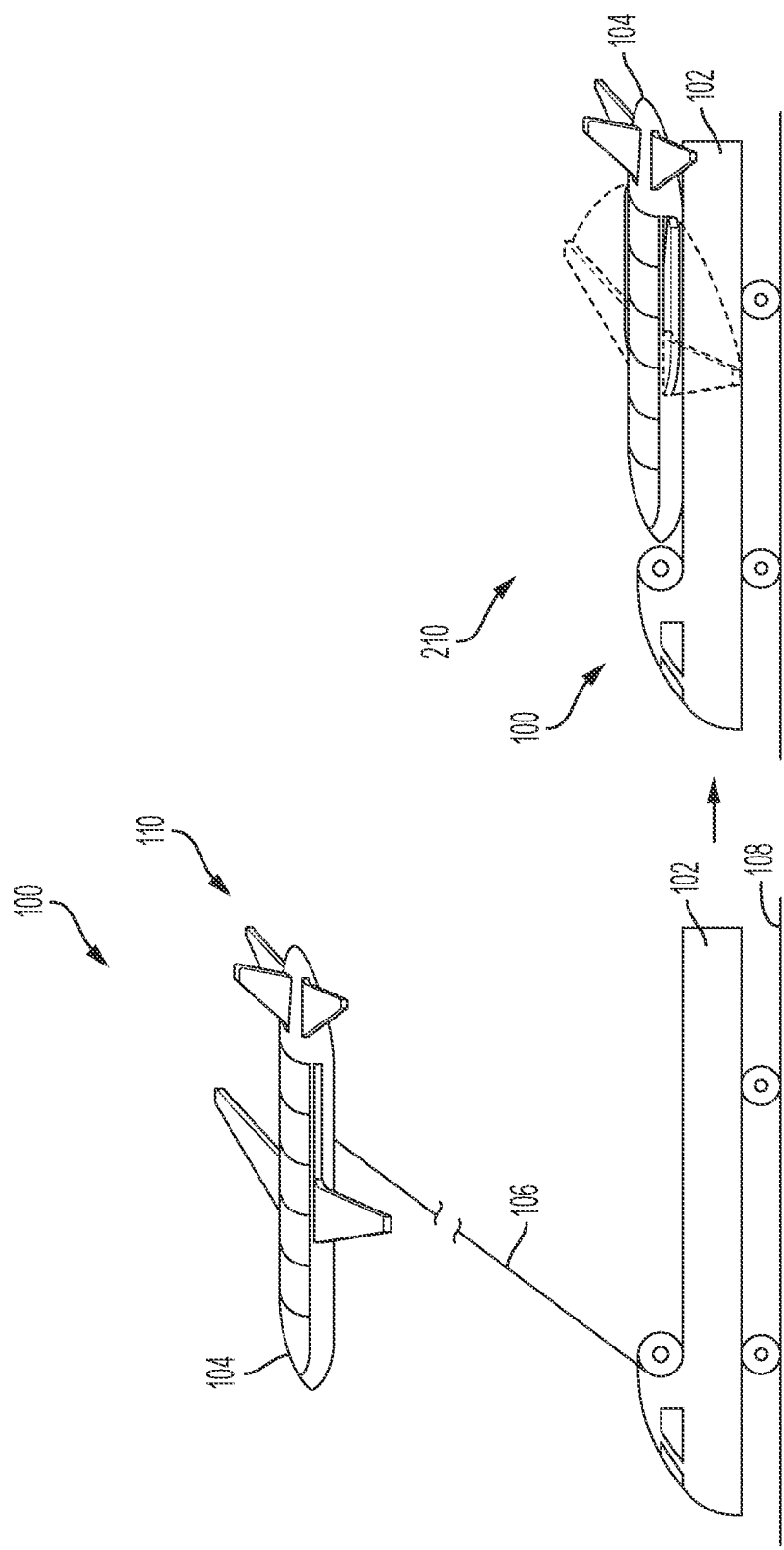

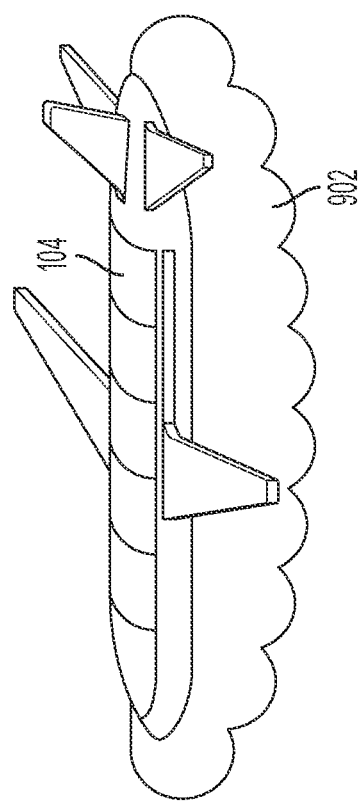
FIG. 9
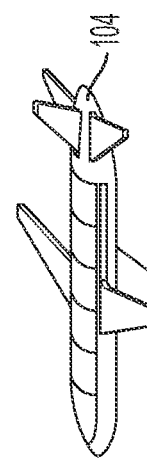
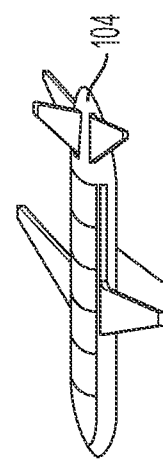
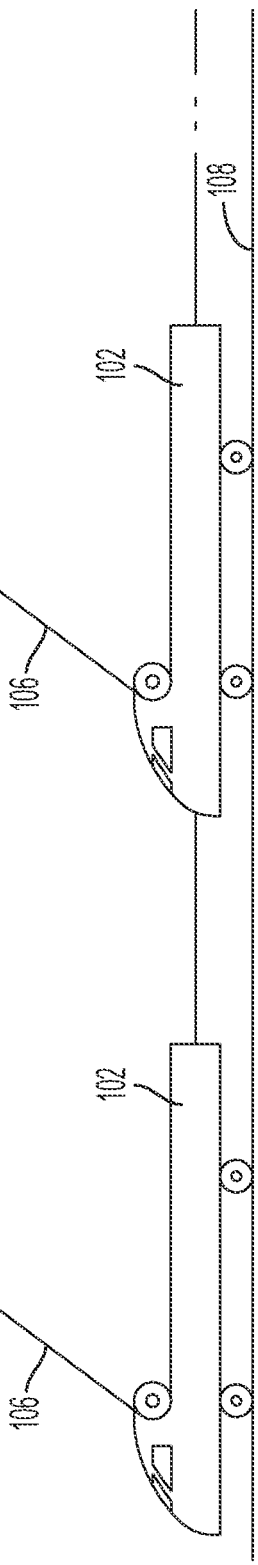
FIG. 10

TETHERED AIRCRAFT MASS TRANSPORTATION

BACKGROUND

Mass transportation or public transportation is an important logistical consideration for cities and populated geographical areas, particularly as population density increases. Many people rely on buses, trains, and aircraft for conveyance between point A and point B rather than using automobiles. The infrastructure of large cities is often planned around mass transportation systems to efficiently move large groups of people in and out of cities for employment and/or recreation. Mass transportation is in many ways more efficient, safer, and more environmentally friendly than the use of personal automobiles whenever possible. Subways, above and below ground train systems, and buses are commonly used to move people in, out, and around cities, while trains, aircraft, and ships are often used to move large numbers of people across vast distances.

However, subways, buses, trains, and other conventional mass transportation systems are often overcrowded and inadequate for efficiently moving populations from location to location. As the overall population of the world continues to increase, and in particular as the population of cities continue to grow and increase dramatically in density, the need for improved efficient mass transportation systems increases substantially. Various embodiments of the present tethered aircraft mass transportation system recognize and address the foregoing considerations, and others, of prior art systems.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure, a mass transportation system includes a host vehicle and at least one airborne passenger vehicle. The host vehicle is configured to traverse along a fixed route. The airborne passenger vehicle is deployably and retractably coupled to the host vehicle via a tether. Each airborne passenger vehicle is moveable from a stowed position fixedly secured to the host vehicle to a deployed position in which the airborne passenger vehicle is tethered to the host vehicle and flying above the host vehicle.

According to another aspect of the disclosure, a mass transportation system includes a rail car and an airborne passenger vehicle. The rail car is configured to traverse along a rail system. The airborne passenger vehicle is electrically and physically tethered to the rail car via a cable that is deployable and retractable. The rail car and the airborne passenger vehicle are configured to depart a first passenger station with the airborne passenger vehicle in a stowed position against the rail car, deploy the airborne passenger vehicle to a deployed position in which the airborne passenger vehicle is tethered to the rail car and flying above the rail car, and retract the airborne passenger vehicle to the stowed position prior to entering a second passenger station.

According to yet another aspect of the disclosure, a method for transporting passengers is provided. The method includes departing a first station along one or more rails with a host vehicle coupled to an airborne passenger vehicle. The airborne passenger vehicle is uncoupled from the host vehicle and lift is increased with the airborne passenger vehicle to climb to a determined altitude. A tether is extended connecting the airborne passenger vehicle and the host vehicle while the airborne passenger vehicle gains altitude. The determined altitude is maintained during transit between the first station and a second station. The tether is retracted prior to the second station to pull the airborne passenger vehicle to the host vehicle. The airborne passenger vehicle is coupled to the host vehicle for entry into the second station and the second station is entered for passenger embarkation and debarkation.

BRIEF DESCRIPTION OF THE DRAWINGS

Various embodiments of the disclosure will be described below. In the course of the description, reference will be made to the accompanying drawings, which are not necessarily drawn to scale, and wherein:

FIG. 1 is a side view of a mass transportation system with an airborne passenger vehicle deployed and flying above a host vehicle, according to various embodiments described herein.

FIG. 2 is a side view of a mass transportation system with an airborne passenger vehicle positioned in a stowed configuration and secured to a host vehicle, according to various embodiments described herein.

FIG. 9 is a perspective view of an airborne passenger vehicle with an emergency airbag deployed, according to various embodiments described herein.

FIG. 10 is a side view of a mass transportation system with multiple host vehicles and airborne passenger vehicles, according to various embodiments described herein.

DETAILED DESCRIPTION OF VARIOUS EMBODIMENTS

Figure 3A:
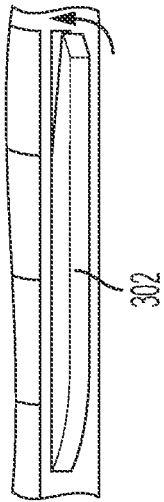
FIG. 3A is a perspective view of a portion of an airborne passenger vehicle showing wings in an extended configuration for flight, according to various embodiments described herein.

Various embodiments will now be described more fully hereinafter with reference to the accompanying drawings. It should be understood that the concepts disclosed herein may be embodied in many different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout.

As discussed briefly above, efficient mass transportation is essential to city planning, enabling urban and suburban populations to increase as cities and corresponding business and residence densities increase. Without mass transportation systems, people rely on vehicles to commute in and out of cities on a daily basis. Road and highway capacity cannot keep up with the traffic requirements, creating gridlock and accidents. Air quality likewise suffers as vehicle emissions increase with the vehicle density. There is a need for replacement and/or supplemental mass transportation systems in today's city planning and corresponding infrastructure.

Utilizing the concepts and technologies described herein, a mass transportation system utilizes one or more host vehicles, each host vehicle pulling an airborne passenger vehicle configured to transport passengers within an enclosed cabin within. Specifically, the airborne passenger vehicle may be configured as a glider aircraft that is tethered to the host vehicle. The host vehicle may be rail based, such as a monorail or train configured to move along a track or one or more rails. The glider is tethered to the train car, allowing the glider to be coupled to the train car for passenger loading and unloading at stations and uncoupled during transit to allow the glider to climb above the train car to a desired altitude controlled at least in part by a length of the tether while being pulled through the air by the train car below.

For the purposes of this disclosure, the terms "host vehicle," "train car," "rail car," and the like may be used interchangeably to refer to a land-based vehicle that moves along a guided or fixed route to pull the airborne passenger vehicle between passenger loading and unloading stations. The host vehicle may include an engine or drive mechanism configured to propel the host vehicle along the rails or fixed route. Alternatively, the host vehicle may be coupled to another vehicle that includes an engine or drive mechanism such that the host vehicle is pulled or pushed along the fixed route. Additionally, for the purposes of this disclosure, a guided or fixed route includes a predetermined route or path that includes a mechanism such as one or more rails to direct or guide a vehicle without requiring steering.

Turning now to FIG. 1, a mass transportation system 100 according to one embodiment will be described. The mass transportation system 100 includes a host vehicle 102 and an airborne passenger vehicle 104 with a tether 106 connecting the two vehicles. The host vehicle 102 may be a rail car configured to travel along railroad tracks similar to a train or monorail. In this context, the host vehicle 102 may be a train engine or train car configured to move along rails. Alternatively, the host vehicle 102 may be a monorail or other electrically driven vehicle traveling along rails or along a guided or fixed route. FIG. 1 shows the host vehicle 102 and the airborne passenger vehicle 104 in the deployed configuration 110 in which the airborne passenger vehicle 104 is flying above the host vehicle 102, which is traveling along rails or a track 108.

Figure 3B:
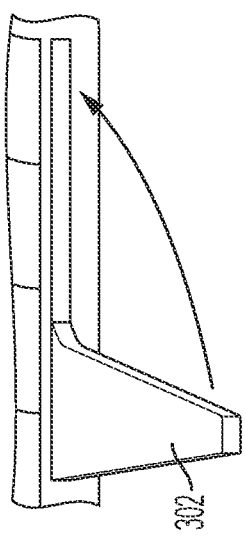
FIG. 3B is a perspective view of a portion of an airborne passenger vehicle showing wings swept rearward in a stowed configuration, according to various embodiments described herein.

FIG. 2 shows the host vehicle 102 and the airborne passenger vehicle 104 in the stowed configuration 210 in which the airborne passenger vehicle 104 is removably coupled to and abutting the host vehicle 102. The stowed configuration 210 may be used when approaching and departing a passenger station or terminal used for passenger embarkation and debarkation. The airborne passenger vehicle 104 of FIG. 2 is shown with the wings folded back in a stowed configuration, with broken lines showing the wings deployed outward in a flight configuration. FIGS. 3A and 3B show wings 302 in deployed and stowed configurations, respectively.

It should be appreciated that the embodiments described herein are not limited to an airborne passenger vehicle 104 with moveable wings. Rather, according to various embodiments, the airborne passenger vehicle 104 has fixed wings. Moveable wings that fully retract or partially sweep rearward to decrease the overall width of the aircraft measured from wingtip to wingtip simplifies the design of the corresponding passenger terminals or stations. By decreasing the width of the airborne passenger vehicle 104 to a width similar to the width of the host vehicle 102, the wings do not overlap or significantly overlap the passenger platform of the terminal. In doing so, the facility footprint required for the passenger terminal decreases and passenger safety is increased.

Figure 4:
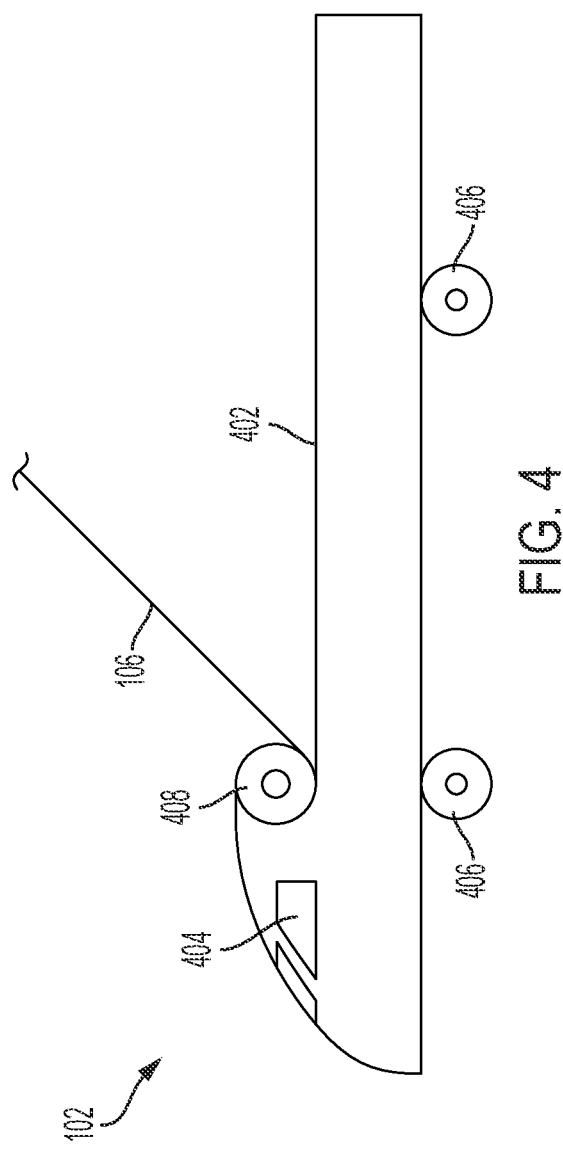
FIG. 4 is a side view of a host vehicle, according to various embodiments described herein.

FIG. 4 shows an illustrative embodiment of a host vehicle 102. This is just one non-limiting example of a configuration of the host vehicle 102. The host vehicle 102 may be any size, shape, and configuration. The host vehicle 102 may be controlled by an onboard driver in the host vehicle 102 or in any vehicle pulling or pushing the host vehicle 102, may be remotely controlled or controlled by a computer system that is onboard the host vehicle or remotely located, or may include any combination of human or computer control systems. The host vehicle 102 may be electrically powered, receiving power via the tracks 108. The host vehicle 102 may transfer power to the airborne passenger vehicle via the tether 106 such that the entire mass transportation system 100 is electrically powered, reducing the carbon footprint as compared to vehicles utilizing fuel and combustion engines.

According to this example shown in FIG. 4, the host vehicle 102 includes a landing and launch deck 402, a drive compartment 404, wheels 406, and a retraction and deployment mechanism 408. The landing and launch deck 402 is configured to abut and/or mate with the airborne passenger vehicle 104 when the airborne passenger vehicle is stowed for passenger loading or unloading. As will be described in greater detail below with respect to FIG. 8, the mass transportation system 100 may include one or more mechanisms for facilitating coupling and securing the airborne passenger vehicle 104 to the landing and launch deck 402 of the host vehicle 102.

The drive compartment 404 of this example is where the driver controls the acceleration and deceleration of the host vehicle 102 to drive the host vehicle along a track via wheels 406. It should be appreciated that any type of drive system, human controlled or computer controlled, onboard or remotely, may be used without departing from the scope of this disclosure. The wheels 406 may engage one or more rails or tracks 108. Alternatively, an electromagnetic drive system or any other type of drive system may be utilized. A driver or computer system within the drive compartment 404 (or remotely located) may additionally control a deployment and retraction mechanism 408 to lengthen and shorten the tether 106 to deploy and retract the airborne passenger vehicle 104. The deployment and retraction mechanism may be a winch operative to spool and unspool the tether 106. The tether may be any type of cable or rope suitable to withstand the tension force applied by the airborne passenger vehicle 104. As will be described further below, the tether may additionally include electrical cables capable of supplying power to the airborne passenger vehicle 104 from the host vehicle 102 or from the electrical rails on which the host vehicle 102 travels.

Figure 5:
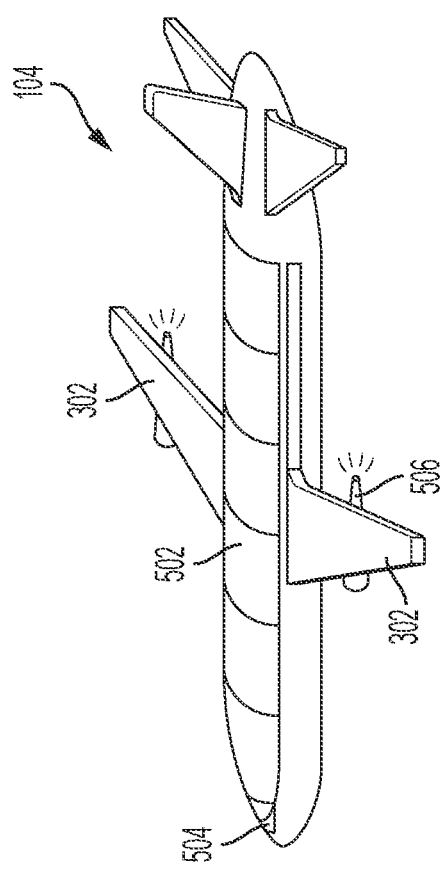
FIG. 5 is a perspective view of an airborne passenger vehicle, according to various embodiments described herein.

FIG. 5 shows an example of the airborne passenger vehicle 104, showing various features. According to one embodiment, the airborne passenger vehicle 104 includes a passenger cabin 502 configured with seats similar to a conventional passenger aircraft for transporting passengers within. The airborne passenger vehicle 104 includes a cockpit 504 configured for at least one pilot that controls various conventional flight controls (not shown) to control pitch, roll, and yaw of the aircraft. Although embodiments of the airborne passenger vehicle 104 include configuration as a glider without engines, according to alternative embodiments shown in FIG. 5, the aircraft may include a propulsion system or engines 506 to assist in takeoff and controlled flight. Engines 506 increase cost and complexity, but also may increase pilot control, particularly in marginal weather, allowing for increased passenger safety.

Figure 6:
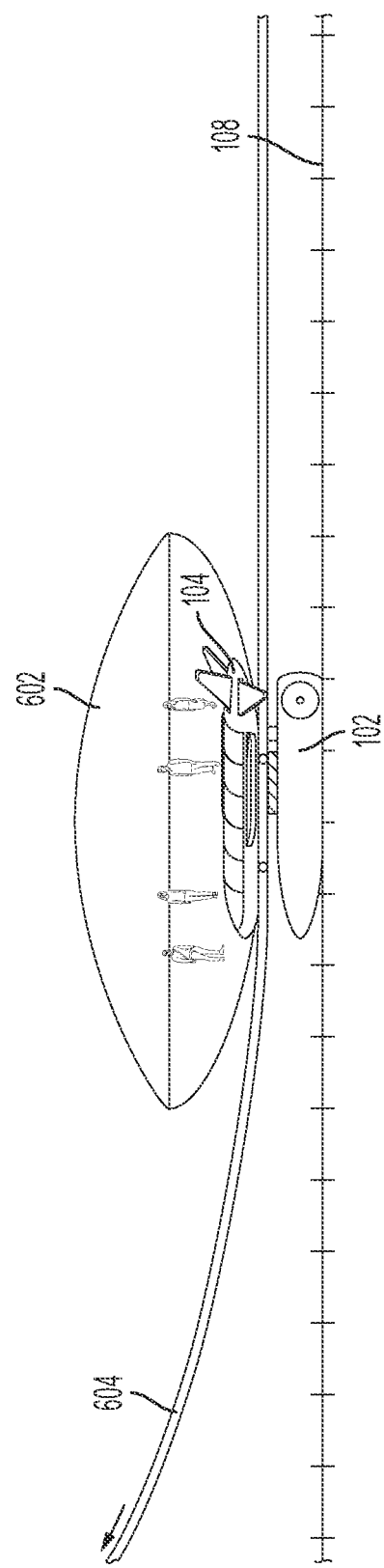
FIG. 6 is a side view of a mass transportation system with a host vehicle and airborne passenger vehicle stopped at a passenger station, according to various embodiments described herein.

FIG. 6 shows an example of the mass transportation system 100, including a passenger station 602 where passengers embark and disembark the airborne passenger vehicle 104. As seen in this example, as well as with respect to FIGS. 7 and 8, various embodiments provide a host vehicle 102 that is configured to drive below ground or below a passenger vehicle track 604. The passenger vehicle track 604 may be configured with an incline or ramp effect departing the passenger station 602 to assist with the transition of the airborne passenger vehicle 104 from the stowed configuration to flight. In this embodiment, the host vehicle rapidly accelerates to takeoff speed. The airborne passenger vehicle 104 is configured to fly at relatively low speeds, utilizing high aspect ratio wings similar to a conventional glider. In this manner, the airborne passenger vehicle 104 is able to takeoff rapidly after departing the passenger terminal 602.

Figure 7:
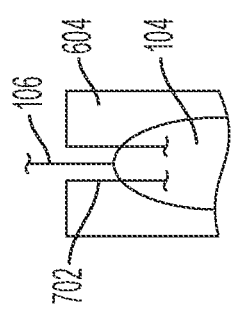
FIG. 7 is a top view of a front portion of an airborne passenger vehicle and passenger vehicle track, according to various embodiments described herein.

Because in this embodiment, the host vehicle 102 travels below ground in a tunnel, only the airborne passenger vehicle 104 is seen above ground. FIG. 7 shows a top view of the front portion of the airborne passenger vehicle 104 and passenger vehicle track 604. In this view, it can be seen that the passenger vehicle track 604 has a slot 702 extending along the longitudinal axis of the track to allow for the tether 106 to pass through from the host vehicle 102. In this embodiment, the airborne passenger vehicle may have wheels or skids attached to an underside of the aircraft for engagement with the passenger vehicle track 604 when the aircraft is in the stowed configuration.

Figure 8:
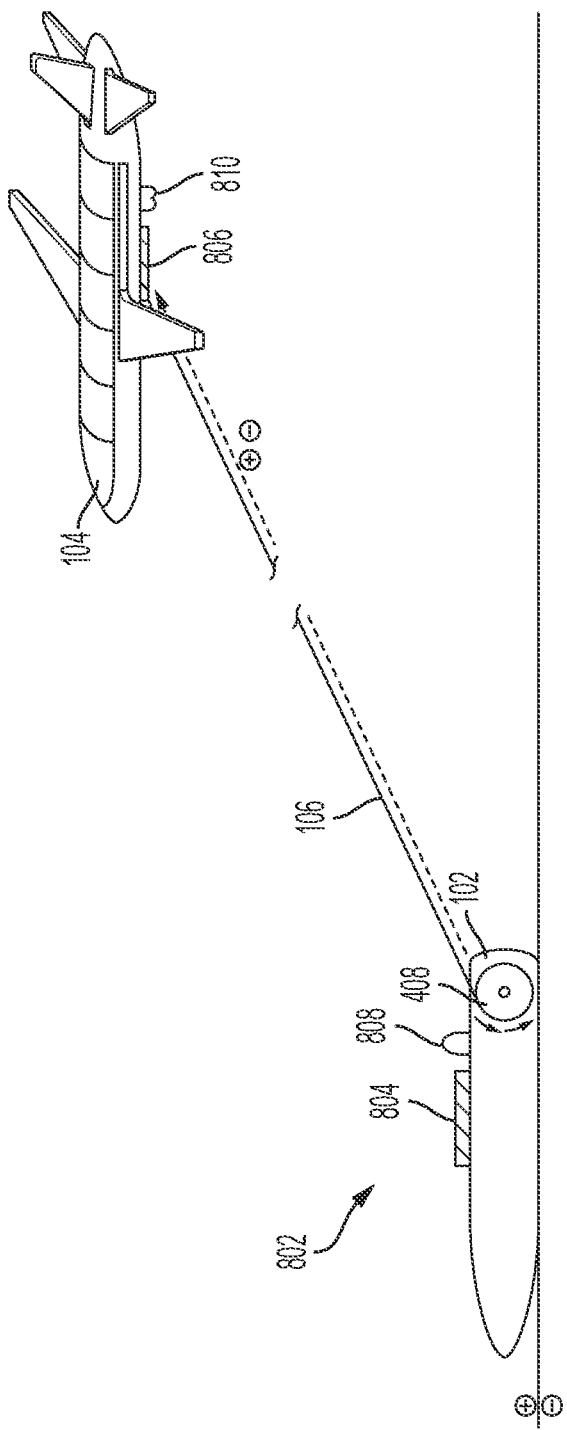
FIG. 8 is a side view of a mass transportation system with an airborne passenger vehicle deployed and flying above a host vehicle, showing coupling mechanisms according to various embodiments described herein.

FIG. 8 shows an example of a host vehicle 102 that is minimal in size and configured to electrically travel along one or more rails while pulling an airborne passenger vehicle 104. As indicated by the "+" and "−" symbols, electricity is provided to the host vehicle 102 via the rails, while power is then provided to the airborne passenger vehicle 104 via the tether 106. FIG. 8 shows examples of one or more coupling mechanisms 802 configured to secure the airborne passenger vehicle 104 to the host vehicle 102 in the stowed configuration. One example of a coupling mechanism 802 includes a first magnet 804 on the host vehicle 102 and a second magnet 806 on the airborne passenger vehicle 104 configured to electromagnetically engage one another when abutting or in close proximity and activated by a person or computer controlling the host vehicle 102 or the airborne passenger vehicle 104.

Another example of the coupling mechanism 802 includes an electromechanical latch having a first mechanism 808 on the host vehicle 102 and a second mechanism 810 on the airborne passenger vehicle 104 configured to selectively engage and disengage one another. It should be appreciated that the coupling mechanism 802 is not limited to the electromagnets and electromechanical latches shown and described herein. Rather, any selectively engaging and disengaging mechanisms may be utilized to couple and uncouple the airborne passenger vehicle 104 and the host vehicle 102.

FIG. 9 shows an embodiment in which the airborne passenger vehicle 104 utilizes an emergency airbag 902 that may be activated in an emergency situation in which the airborne passenger vehicle cannot be safely retracted to the host vehicle 102 using the tether 106. For example, if the host vehicle 102 were to have an emergency that required a quick stop or encounters an emergency, a pilot or crew member of the airborne passenger vehicle 104 may deploy one or more airbags at least partially surrounding or coupled to the aircraft prior to touchdown in an unsafe location or situation in which a safe landing may not be accomplished. In this situation or alternatively to the airbag embodiment, the pilot and/or the operator of the host vehicle 102 may activate an emergency decoupling mechanism that disengages the tether 106 from the aircraft. In this manner, the aircraft may be free to land, with or without an airbag or parachute, away from the host vehicle 102. The emergency decoupling mechanism may operate to release or sever the tether 106 at a location proximate to the airborne passenger vehicle 104.

FIG. 10 illustrates an example of a mass transportation system 100 having multiple host vehicles 102 tethered to multiple airborne passenger vehicles 104. Any number of host vehicle and airborne passenger vehicle combinations may be coupled together, either directly or with intervening cars between, to create a train of any desired length. Alternatively, the host vehicle 102 and corresponding airborne passenger vehicle 104 may operate as a single unit, independent of other host vehicle and aircraft pairs.

In operation, a host vehicle 102 and corresponding airborne passenger vehicle 104 begin at a passenger station 602 where passengers take their seats within the airborne passenger vehicle 104. The host vehicle 102 may or may not be visible, depending on whether the mass transportation system 100 is configured for the host vehicle 102 to travel in tunnels so that only the tethered aircraft is visible. At the desired departure time, the host vehicle 102 with the airborne passenger vehicle 104 in the stowed position begins to move along the corresponding track. The wings 302 are extended into flight position and the coupling mechanism 802 securing the aircraft to the host vehicle is released. At takeoff speed, which may correspond to a top of a takeoff ramp in some configurations, the tether 106 is released or extended and the airborne passenger vehicle 104 lifts off and climbs. The aircraft climbs to the desired altitude and the passengers enjoy the view and flight until approaching the next passenger station. The pilot of the airborne passenger vehicle 104 or the host vehicle controller retracts the tether 106 while the pilot maintains the proper attitude to descend to the host vehicle. Upon contact with the host vehicle 102 or the passenger vehicle track 604, the coupling mechanism 802 is engaged to secure the aircraft in the stowed configuration and the wings 302 are swept rearward for entry into the approaching passenger station 602. After entering the passenger station 602, the host vehicle 102 comes to a stop and the passengers disembark and embark as desired, and the process repeats.

CONCLUSION

Many modifications and other embodiments of the disclosure will come to mind to one skilled in the art to which this disclosure pertains having the benefit of the teachings presented in the foregoing descriptions and the associated drawings. For example, as will be understood by one skilled in the relevant field in light of this disclosure, the disclosure may take form in a variety of different mechanical and operational configurations. Therefore, it is to be understood that the disclosure is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

It should be understood that, although various advantages or features of particular aspects of various embodiments are described above, it should be understood that alternative embodiments of the claimed invention may or may not have one or more of the stated advantages described herein.

What is claimed is:

1. A mass transportation system, comprising:
   a host vehicle configured to traverse along a fixed route;
   at least one airborne passenger vehicle deployably and retractably coupled to the host vehicle via a tether, each airborne passenger vehicle configured to be movable from a stowed position fixedly secured to the host vehicle to a deployed position in which the airborne passenger vehicle is tethered to the host vehicle and flying above the host vehicle; and
   a passenger vehicle track positioned between the host vehicle and the at least one airborne passenger vehicle for at least a portion of the fixed route such that the host vehicle traverses below the passenger vehicle track and the at least one airborne passenger vehicle traverses above the passenger vehicle track with a tether passing through the passenger vehicle track connecting the host vehicle to the at least one airborne passenger vehicle.

2. The mass transportation system of claim 1, wherein the host vehicle comprises a rail car and the fixed route comprises a rail system between a plurality of stations.

3. The mass transportation system of claim 1, wherein the at least one airborne passenger vehicle comprises a glider having a passenger compartment and wings configured to maintain lift sufficient to maintain altitude above the host vehicle utilizing forward airspeed generated by movement of the host vehicle.

4. The mass transportation system of claim 3, wherein the wings are retractable for stowage in the stowed position.

5. The mass transportation system of claim 1, wherein the tether comprises a cable and a winch system.

6. The mass transportation system of claim 1, wherein the host vehicle comprises a train having a plurality of train cars and the at least one airborne passenger vehicle comprises a plurality of gliders, each glider tethered to a separate train car of the train.

7. The mass transportation system of claim 1, wherein the host vehicle and the at least one airborne passenger vehicle are configured to release from the tether for emergency landing.

8. The mass transportation system of claim 1, wherein the host vehicle comprises a train or monorail.

9. The mass transportation system of claim 8, wherein the train or monorail traverses at least one rail that provides electrical power to the train or monorail.

10. The mass transportation system of claim 9, wherein the at least one rail provides electrical power to the airborne passenger vehicle via the tether.

11. The mass transportation system of claim 1, further comprising a coupling mechanism configured to secure the airborne passenger vehicle to the host vehicle in the stowed configuration.

12. The mass transportation system of claim 11, wherein the coupling mechanism is electromagnetic.

13. The mass transportation system of claim 1, wherein the airborne passenger vehicle comprises one or more propulsion systems.

14. The mass transportation system of claim 1, wherein the airborne passenger vehicle comprises an airbag encompassing at least a portion of the airborne passenger vehicle during an emergency landing.

15. A mass transportation system, comprising:
    a rail car configured to traverse along a rail system;
    an airborne passenger vehicle electrically and physically tethered to the rail car via a cable that is deployable and retractable; and
    a passenger vehicle track positioned between the rail car and the airborne passenger vehicle for at least a portion of the rail system such that the rail car traverses below the passenger vehicle track and the airborne passenger vehicle traverses above the passenger vehicle track with a tether passing through the passenger vehicle track connecting the rail car to the airborne passenger vehicle,
    wherein the rail car and the airborne passenger vehicle are configured to depart a first passenger station with the airborne passenger vehicle in a stowed position against the passenger vehicle track and the rail car, deploy the airborne passenger vehicle to a deployed position in which the airborne passenger vehicle is tethered to the rail car and flying above the passenger vehicle track and the rail car, and retract the airborne passenger vehicle to the stowed position prior to entering a second passenger station.

16. The mass transportation system of claim 15, wherein the airborne passenger vehicle comprises a glider having a passenger cabin and wings configured to maintain lift sufficient to maintain altitude above the host vehicle utilizing forward airspeed generated by movement of the host vehicle.

17. The mass transportation system of claim 16, wherein the wings are retractable for stowage in the stowed position.

18. The mass transportation system of claim 15, wherein the tether comprises a cable and a winch system.

19. The mass transportation system of claim 15, wherein the rail car traverses at least one rail that provides electrical power to the rail car and to the airborne passenger vehicle via the tether.

20. A method for transporting passengers, comprising:
    departing a first station along one or more rails with a host vehicle coupled to an airborne passenger vehicle abutting a passenger vehicle track, the passenger vehicle track positioned above the host vehicle and below the airborne passenger vehicle and configured to rise upward from the one or more rails to increase a distance between the host vehicle and the airborne passenger vehicle as the host vehicle moves away from the first station;
    uncoupling the airborne passenger vehicle from the host vehicle;
    increasing the distance between the host vehicle and the airborne passenger vehicle while the airborne passenger vehicle abuts the passenger vehicle track;

increasing lift with the airborne passenger vehicle to lift from the passenger vehicle track and climb to a determined altitude;
extending a tether connecting the airborne passenger vehicle and the host vehicle while the airborne passenger vehicle gains altitude;
maintaining the determined altitude during transit between the first station and a second station;
retracting the tether prior to the second station to pull the airborne passenger vehicle to the host vehicle;
coupling the airborne passenger vehicle to the host vehicle for entry into the second station; and
entering the second station for passenger disembarkation and embarkation.

\* \* \* \* \*